US010875627B2

(12) United States Patent
Kurikesu et al.

(10) Patent No.: US 10,875,627 B2
(45) Date of Patent: Dec. 29, 2020

(54) MOVABLE COVER FOR A PROPROTOR NACELLE

(71) Applicant: Bell Helicopter Textron Inc., Fort Worth, TX (US)

(72) Inventors: Abey Kurikesu, Fort Worth, TX (US); Amarjit O. Kizhakkepat, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 399 days.

(21) Appl. No.: 15/968,649

(22) Filed: May 1, 2018

(65) Prior Publication Data

US 2019/0337606 A1 Nov. 7, 2019

(51) Int. Cl.
*B64C 7/02* (2006.01)
*B64C 29/00* (2006.01)
*B64D 7/00* (2006.01)

(52) U.S. Cl.
CPC ............ *B64C 7/02* (2013.01); *B64C 29/0033* (2013.01); *B64D 7/00* (2013.01)

(58) Field of Classification Search
CPC ......... B64C 1/14; B64C 1/1446; B64C 25/16; B64C 7/00; B64C 7/02; B64C 29/0033; B64C 29/0075; B64C 27/28; B64C 15/12; B64C 27/52; B64D 29/06; B64D 29/08; B64D 29/00
See application file for complete search history.

(56) References Cited

U.S. PATENT DOCUMENTS

| 2,921,146 A | 1/1960 | Ericson |
| 3,392,244 A | 7/1968 | Hillmann |
| 3,666,209 A | 5/1972 | Taylor |

(Continued)

FOREIGN PATENT DOCUMENTS

| EP | 2497402 A2 | 9/2012 |
| EP | 3369654 A1 | 9/2018 |

(Continued)

OTHER PUBLICATIONS

Office Action, dated Sep. 18, 2020, by the USPTO, re U.S. Appl. No. 16/127,115.

(Continued)

*Primary Examiner* — Joshua J Michener
*Assistant Examiner* — Cindi M Curry
(74) *Attorney, Agent, or Firm* — Timmer Law Group, PLLC

(57) ABSTRACT

An aircraft, including a fixed nacelle disposed on a wing of the aircraft, the fixed nacelle including a nacelle opening; a proprotor pylon disposed on the wing and rotatable relative to the fixed nacelle between a substantially horizontal position and a non-horizontal position, wherein rotation of the proprotor pylon to a non-horizontal position exposes the nacelle opening; and a movable cover disposed on at least one of the wing and fixed nacelle, said movable cover including a plurality of cover members that are movable between a closed position where at least a portion of the cover members collectively form a protective cover in front of the nacelle opening when the proprotor pylon is positioned in the non-horizontal position and a stowed position where at least a portion of the plurality of cover members are stowed. In other aspects, there is provide a method of covering a nacelle opening.

19 Claims, 12 Drawing Sheets

(56) References Cited

U.S. PATENT DOCUMENTS

| | | | |
|---|---|---|---|
| 4,037,809 | A | 7/1977 | Legrand |
| 4,172,423 | A | 10/1979 | Monne |
| 5,395,073 | A | 3/1995 | Rutan et al. |
| 5,863,013 | A | 1/1999 | Schmittle |
| 6,098,342 | A | 8/2000 | Bischof et al. |
| 6,260,793 | B1 | 7/2001 | Balayn et al. |
| 6,382,556 | B1 | 5/2002 | Pham |
| 6,974,105 | B2 | 12/2005 | Pham |
| 7,143,973 | B2 | 12/2006 | Ballew |
| 8,066,219 | B2 | 11/2011 | Patt et al. |
| 8,757,546 | B2 | 6/2014 | Porte et al. |
| 9,126,678 | B2 | 9/2015 | Ross et al. |
| 9,174,731 | B2 | 11/2015 | Ross et al. |
| 9,199,732 | B2 | 12/2015 | Isaac et al. |
| 10,106,255 | B2 | 10/2018 | Convington et al. |
| 10,533,603 | B2 | 1/2020 | Pravanh et al. |
| 10,539,180 | B2 | 1/2020 | Pravanh et al. |
| 2001/0037613 | A1 | 11/2001 | Owens |
| 2005/0045762 | A1 | 3/2005 | Pham |
| 2008/0066259 | A1 | 3/2008 | Prieur |
| 2009/0307981 | A1 | 12/2009 | Loidolt |
| 2010/0059628 | A1 | 3/2010 | Kobayashi et al. |
| 2011/0089714 | A1 | 4/2011 | Kitayama |
| 2015/0165759 | A1 | 6/2015 | Landa et al. |
| 2018/0251227 | A1 | 9/2018 | Ross et al. |
| 2018/0252263 | A1 | 9/2018 | Pravanh et al. |
| 2018/0252264 | A1 | 9/2018 | Pravanh et al. |
| 2019/0092485 | A1 | 3/2019 | Decker et al. |

FOREIGN PATENT DOCUMENTS

| | | |
|---|---|---|
| EP | 3369659 A1 | 9/2018 |
| EP | 3378767 A1 | 9/2018 |
| EP | 3369659 B1 | 1/2019 |
| EP | 3378767 B1 | 1/2019 |
| EP | 3369654 B1 | 10/2019 |
| EP | 3626612 A1 | 3/2020 |
| FR | 2892142 A1 | 4/2007 |
| FR | 2010-A84173 | 7/2009 |

OTHER PUBLICATIONS

CA Notice of Allowance, dated Apr. 23, 2020, by the CIPO, re CA App No. 2,986,741.
EP Invitation pursuant to Rule 62a(1) EPC, dated Oct. 1, 2019, by the EPO, re EP Patent App No. 19192072.7.
EP Search Report, dated Feb. 27, 2018, by the EPO, re EP Patent App No. 17197649.1.
EP Exam Report, dated Mar. 12, 2018, by the EPO, re EP Patent App No. 17197649.1.
Invitation pursuant to Rule 62a(1) EPC, dated Mar. 1, 2018, by the EPO, re EP Patent App No. 17197811.7.
Partial EP Search Report, dated May 2, 2018, by the EPO, re EP Patent App No. 17197811.7.
EP Exam Report, dated May 25, 2018, by the EPO, re EP Patent App No. 17197811.7.
EP Search Report, dated Feb. 27, 2018, by the EPO, re EP Patent App No. 17197812.5.
EP Exam Report, dated Mar. 12, 2018, by the EPO, re EP Patent App No. 17197812.5.
Communication under Rule 71(3) EPC—Intention to Grant, dated May 23, 2019, by the EPO, re EP Patent Application No. 17197811.7.
Office Action, dated Jun. 17, 2019, by the USPTO, re U.S. Appl. No. 15/448,415.
Office Action, dated Jun. 17, 2019, by the USPTO, re U.S. Appl. No. 15/448,136.
CA Office Action, dated Jul. 23, 2019, by the CIPO, re CA Patent App No. 2,986,741.
EP Search Report, dated Feb. 20, 2020, by the EPO re EP Patent App No. 19192072.7.
EP Exam Report, dated Mar. 31, 2020, by the EPO, re EP App No. 19192072.7.
Office Action, dated Jul. 10, 2020, by the USPTO, re U.S. Appl. No. 15/661,129.
Canadian Office Action, dated Oct. 1, 2018, by the CIPO, re CA Patent App No. 2,986,741.
EP Communication under Rule 71(3) EPC—Intention to Grant, dated Sep. 28, 2018, by the EPO, re EP Patent App No. 17197649.1.
EP Communication under Rule 71(3) EPC—Intention to Grant, dated Oct. 10, 2018, by the EPO, re EP Patent App No. 17197812.5.
EP Exam Report, dated Nov. 19, 2018, by the EPO, re EP Patent App No. 17197811.7.
EP Decision to Grant, dated Dec. 6, 2018, by the EPO, re EP Patent App No. 17197649.1.
EP Decision to Grant, dated Dec. 6, 2018, by the EPO, re EP Patent App No. 17197812.5.
Notice of Allowance, dated Oct. 2, 2019, by the USPTO, re U.S. Appl. No. 15/448,136.
Notice of Allowance, dated Oct. 3, 2019, by the USPTO, re U.S. Appl. No. 15/448,415.

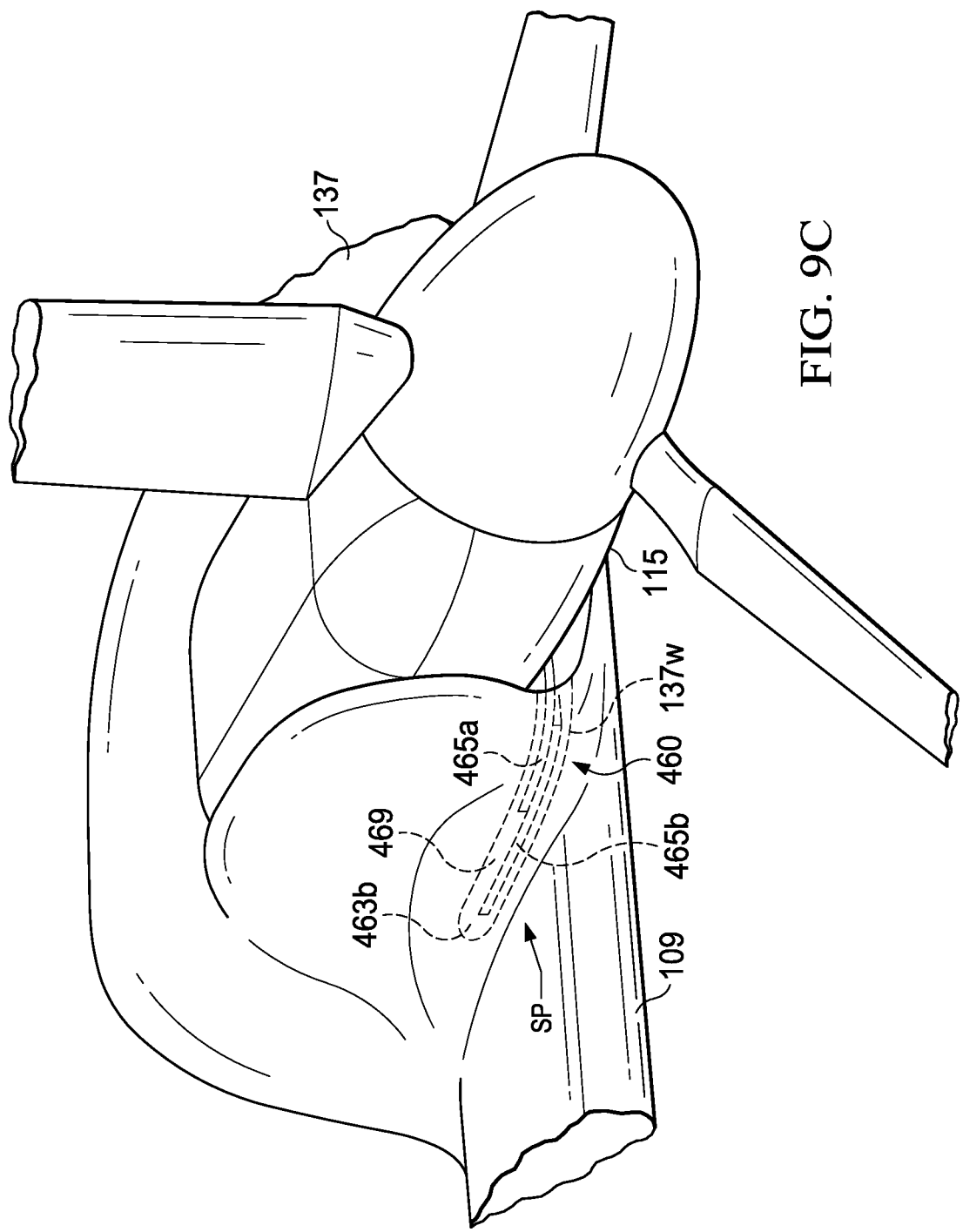

MOVABLE COVER FOR A PROPROTOR NACELLE

BACKGROUND

Technical Field

The present disclosure relates to an aircraft, and more particularly, to a tiltrotor aircraft having a fixed engine nacelle on an aircraft wing, a proprotor nacelle enclosing a rotatable proprotor pylon, and further having a movable cover that covers a nacelle opening that is exposed when the proprotor is positioned for operation of the aircraft in a conversion mode and a helicopter mode.

Description of Related Art

Certain tiltrotor aircraft, such as the Bell V-280 Valor, employ a fixed engine with an associated engine nacelle on each wing and a rotatable proprotor pylon associated with a proprotor gearbox that is coupled to a respective engine output gearbox and drives the rotor blades of each proprotor. Each proprotor pylon is rotatable relative to the respective fixed nacelle to convert between a vertical flight (helicopter) mode and a forward flight (airplane) mode and vice versa. Each proprotor pylon also is rotatable to an intermediate position between the helicopter mode and the airplane mode to provide what is termed a conversion mode of operation.

Each proprotor pylon includes a pylon fairing fixed thereon to cover certain internal proprotor components during the helicopter mode of operation and the conversion mode of operation. However, in some versions of the aircraft, certain proprotor components nevertheless are exposed through openings in the pylon fairing. For example, in a particular version of a tiltrotor aircraft, forward portions of pillow blocks that rotatably support the proprotor gearbox on each wing are exposed through forwardly-facing slots in the pylon fairing when the proprotor pylon is positioned in the conversion mode and the helicopter mode of operation. The exposed pillow blocks/slots as well as gaps between the pylon fairing and the fixed nacelle during the conversion mode and the helicopter mode of operation create forward-facing cavities that adversely affect the infrared and radar signature of the aircraft.

Moreover, the exposed pillow blocks and corresponding slots as well as gaps between the pylon fairing and the fixed nacelle may be subject to damage from ballistic strikes, bird strikes, and entry of ambient environmental particulate elements such as dirt, sand, etc. during these modes of operation.

Still further, the exposed pillow blocks/slots as well as the gaps between the pylon fairing and the fixed nacelle can adversely affect aerodynamic performance of the aircraft.

There is a need to reduce the infrared and radar signatures of such aircraft as well as to protect exposed proprotor components from possible damage from ballistic strikes, bird strikes and environmental elements and reduce adverse effects on aerodynamic performance of such aircraft.

SUMMARY

In a first aspect, there is provided an aircraft including a fixed nacelle disposed on a wing of the aircraft, the fixed nacelle including a nacelle opening; a proprotor pylon disposed on the wing and rotatable relative to the fixed nacelle between a substantially horizontal position and a non-horizontal position, wherein rotation of the proprotor pylon to a non-horizontal position exposes the nacelle opening; and a movable cover disposed on at least one of the wing and the fixed nacelle, said movable cover including a plurality of cover members that are movable between a closed position where at least a portion of the cover members collectively form a protective cover in front of the nacelle opening when the proprotor pylon is positioned in the non-horizontal position and a stowed position where at least a portion of the plurality of cover members are stowed.

In an embodiment, there is provided a linkage connected between the movable cover and the proprotor pylon that rotation of the proprotor pylon moves the cover members to a closed position.

In another embodiment, there is provided an actuator coupled to the movable cover to move at least a portion of the plurality of cover members.

In yet another embodiment, the fixed nacelle defines a channel that receives the proprotor pylon when the proprotor pylon is rotated to the substantially horizontal position.

In still another embodiment, the movable cover is stowed at least partially in the channel of the fixed nacelle.

In an exemplary embodiment, the movable cover is stowed at least partially in the wing.

In an example, the plurality of cover members includes a plurality of cover slats.

In another example, the plurality of cover slats is disposed on a support frame.

In yet another embodiment, the support frame is disposed on at least one of the wing and the fixed nacelle.

In an embodiment, there is provided a flexible cover in contact with at least one of the following: the plurality of cover members, the plurality of cover slats, and the support frame.

In still another embodiment, the cover slats are interlinked and movably coupled to a plurality of support tracks.

In an embodiment, the cover slats are interlinked by being in contact with a flexible secondary layer.

In another embodiment, the cover members include a plurality of cover shells.

In an exemplary embodiment, the plurality of cover shells includes telescoping cover shells that are pivotally and slidably connected.

In an embodiment, the protective cover has a forwardly bowed shape when the proprotor pylon is in a non-horizontal position.

In another embodiment, the plurality of cover members includes a material selected from at least one of the following: a ceramic material, a composite material, a metallic material, an elastomeric material, and an armored material.

In a second aspect, there is provided a movable cover for a proprotor pylon, wherein the movable cover includes a plurality of cover members configured to substantially cover a nacelle opening that is exposed when the proprotor pylon is in a non-horizontal position.

In an embodiment, the plurality of cover members includes a plurality of cover slats.

In another embodiment, there is provided a support frame on which the cover slats are movably disposed.

In an exemplary embodiment, there is provided support tracks on which the cover slats are movably disposed.

In still another embodiment, there is a flexible cover in contact with the plurality of cover members.

In an embodiment, the plurality of cover members includes a plurality of cover shells.

In an embodiment, the plurality of cover members includes a material selected from the group consisting of ceramic material, composite material, metallic material, an elastomeric material, and armored material.

In a third aspect, there is provided a movable cover for a proprotor pylon, wherein the movable cover includes a support frame on which a flexible cover is configured to substantially cover a nacelle opening that is exposed when the proprotor pylon is in a non-horizontal position.

In a fourth aspect, there is a method of covering a nacelle opening associated with rotation of a proprotor pylon to a non-horizontal position, including so moving a movable cover having a plurality of cover members that the plurality of cover members collectively form a protective cover in front of the nacelle opening that is exposed when the proprotor pylon is rotated.

In an embodiment, the movable cover is moved by linking the movable cover to a proprotor pylon for movement with the proprotor pylon.

In an exemplary embodiment, the movable cover is moved by an actuator.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 9C is a partial perspective view of a proprotor pylon in horizontal flight mode with the movable cover of FIG. 9A in a stowed position SP, according to still another example embodiment.

DESCRIPTION OF THE PREFERRED EMBODIMENT

Illustrative embodiments of a movable cover for a proprotor nacelle are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," "front", "forwardly facing", or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
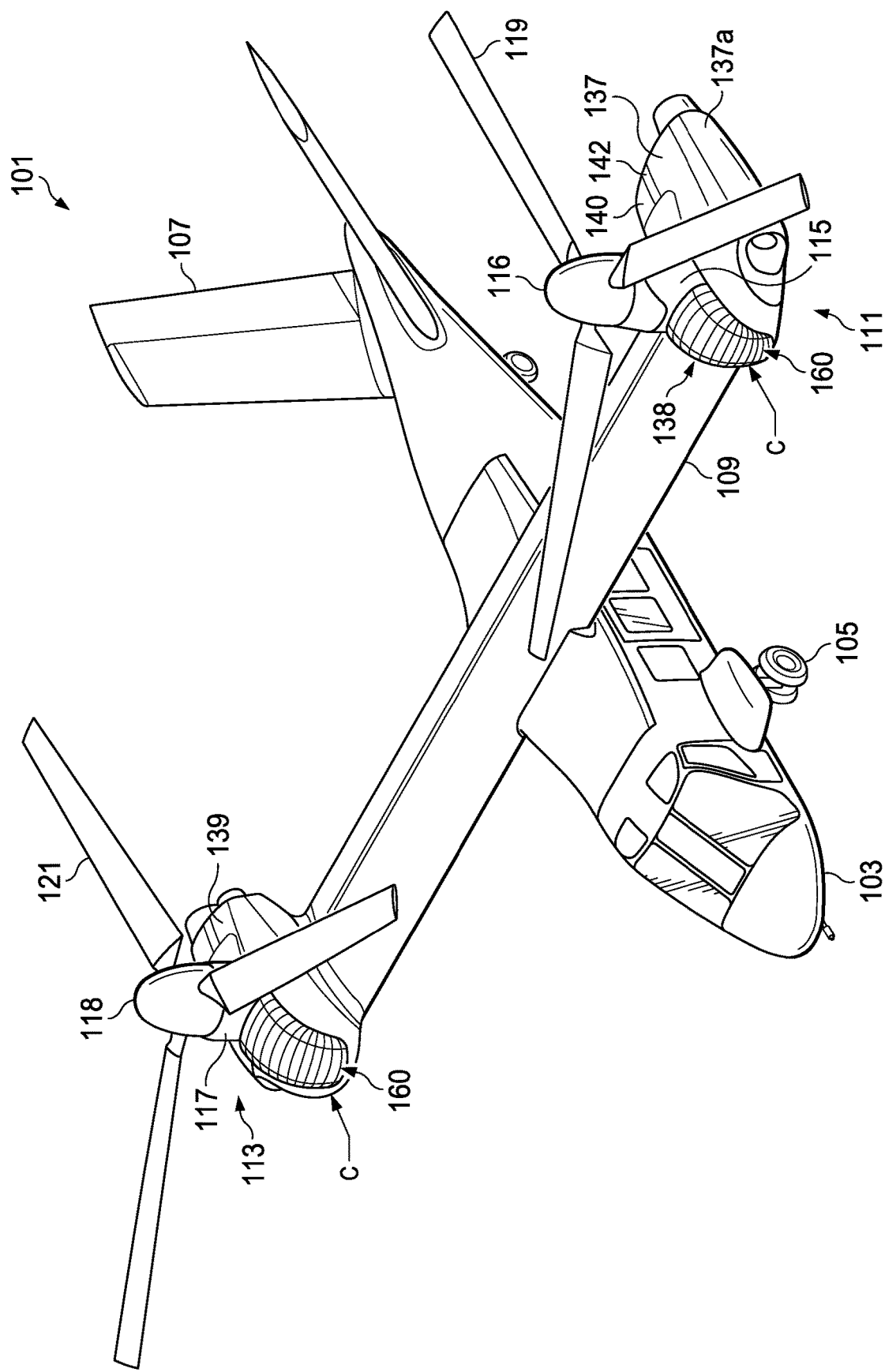
FIG. 1 is a perspective view of a tiltrotor aircraft in the vertical flight mode (helicopter mode), according to one example embodiment.
Figure 2:
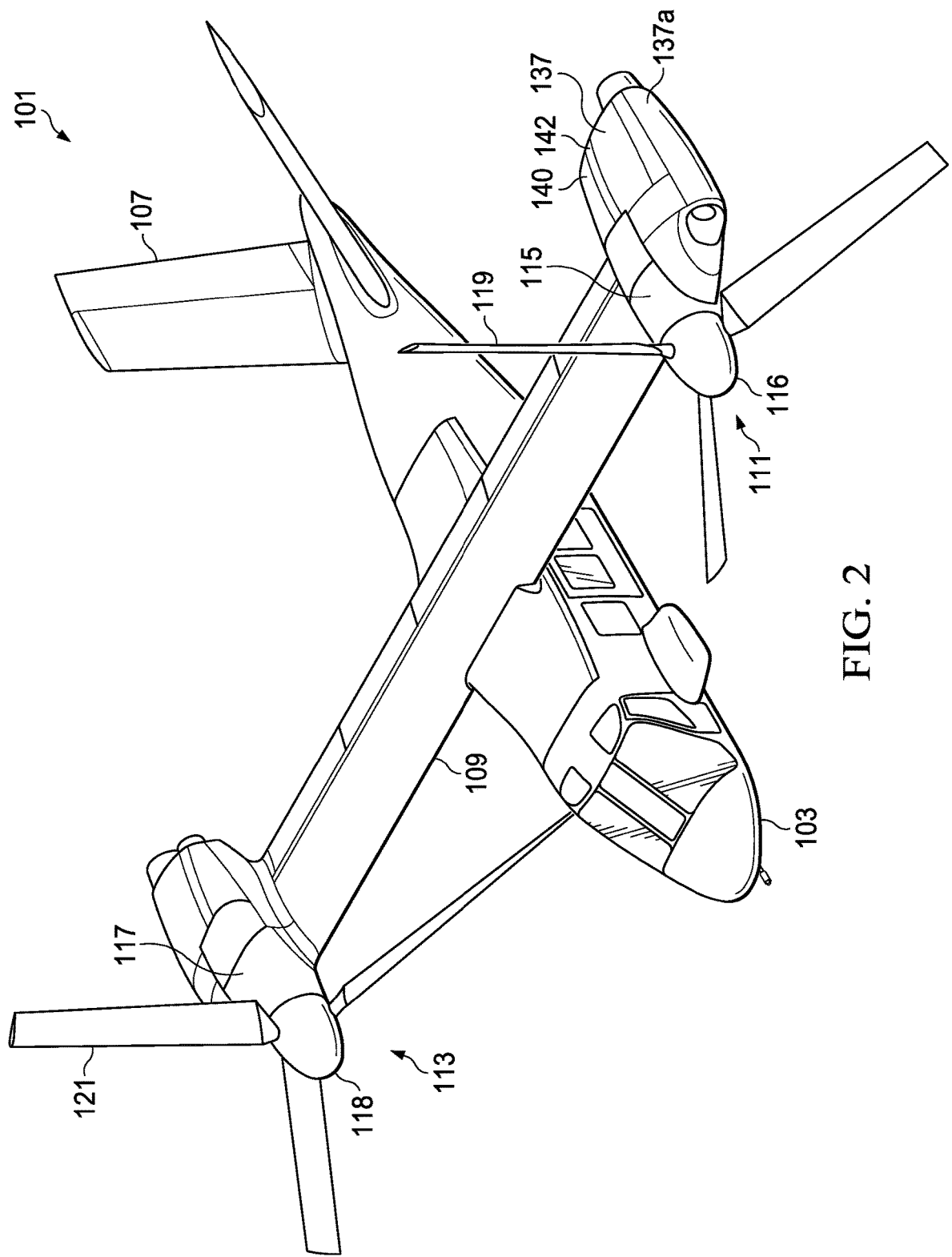
FIG. 2 is a perspective view of a tiltrotor aircraft in the forward flight mode (airplane mode), according to one example embodiment.

Referring to FIGS. 1 and 2 in the drawings, a tiltrotor aircraft 101 is illustrated. Tiltrotor aircraft 101 can include a fuselage 103, a landing gear 105, a tail member 107, and a wing member 109, a propulsion system 111, and a propulsion system 113. Each propulsion system 111, 113 includes a fixed nacelle 137, 139, and a proprotor pylon 115, 117, and a proprotor 116, 118, respectively. Each proprotor 116, 118 rotates and has a plurality of rotor blades 119, 121, respectively. The position of the proprotors 116, 118 as well as the pitch of the plurality of rotor blades 119, 121, can be selectively controlled in order to selectively control direction, thrust, and lift of the tiltrotor aircraft 101. The plurality of rotor blades 119, 121 are each driven by an output shaft in the respective proprotor 116, 118 as described in aforementioned U.S. Pat. No. 9,174,731 that is incorporated herein by reference.

FIG. 1 illustrates tiltrotor aircraft 101 in the vertical flight mode (helicopter mode), in which the proprotor pylons 115, 117 are positioned substantially vertical so the proprotors 116, 118 provide a lifting thrust. FIG. 2 illustrates tiltrotor aircraft 101 in a forward flight mode (airplane mode), in which the proprotor pylons 115, 117 are in a substantially horizontal position so the proprotors 116, 118 provide a forward thrust in which a lifting force is supplied by the wing member 109. It should be appreciated that tiltrotor aircraft can be operated such that proprotors 116, 118 are selectively positioned between the airplane mode and the helicopter mode, which can be referred to as a conversion mode. The proprotors 116, 118 are in non-horizontal positions in the vertical flight and conversion modes.

Propulsion systems 111, 113 are illustrated in the context of tiltrotor aircraft 101; however, propulsion systems 111, 113 can be implemented on other tiltrotor aircraft. For example, an alternative embodiment may include a quad tiltrotor that has an additional wing member aft of the wing member 109, the additional wing member can have additional propulsion systems similar to propulsion systems 111, 113. In another embodiment, propulsion systems 111, 113 can be used with an unmanned version of tiltrotor aircraft 101. Further, propulsion system 111, 113 can be integrated into a variety of tiltrotor configurations.

The propulsion system 113 is substantially symmetric to the propulsion system 111; therefor, for the sake of efficiency certain features will be disclosed only with regards to propulsion system 111. However, one of ordinary skill in the art would fully appreciate an understanding of propulsion system 113 based upon the disclosure herein of propulsion system 111.

Figure 3:
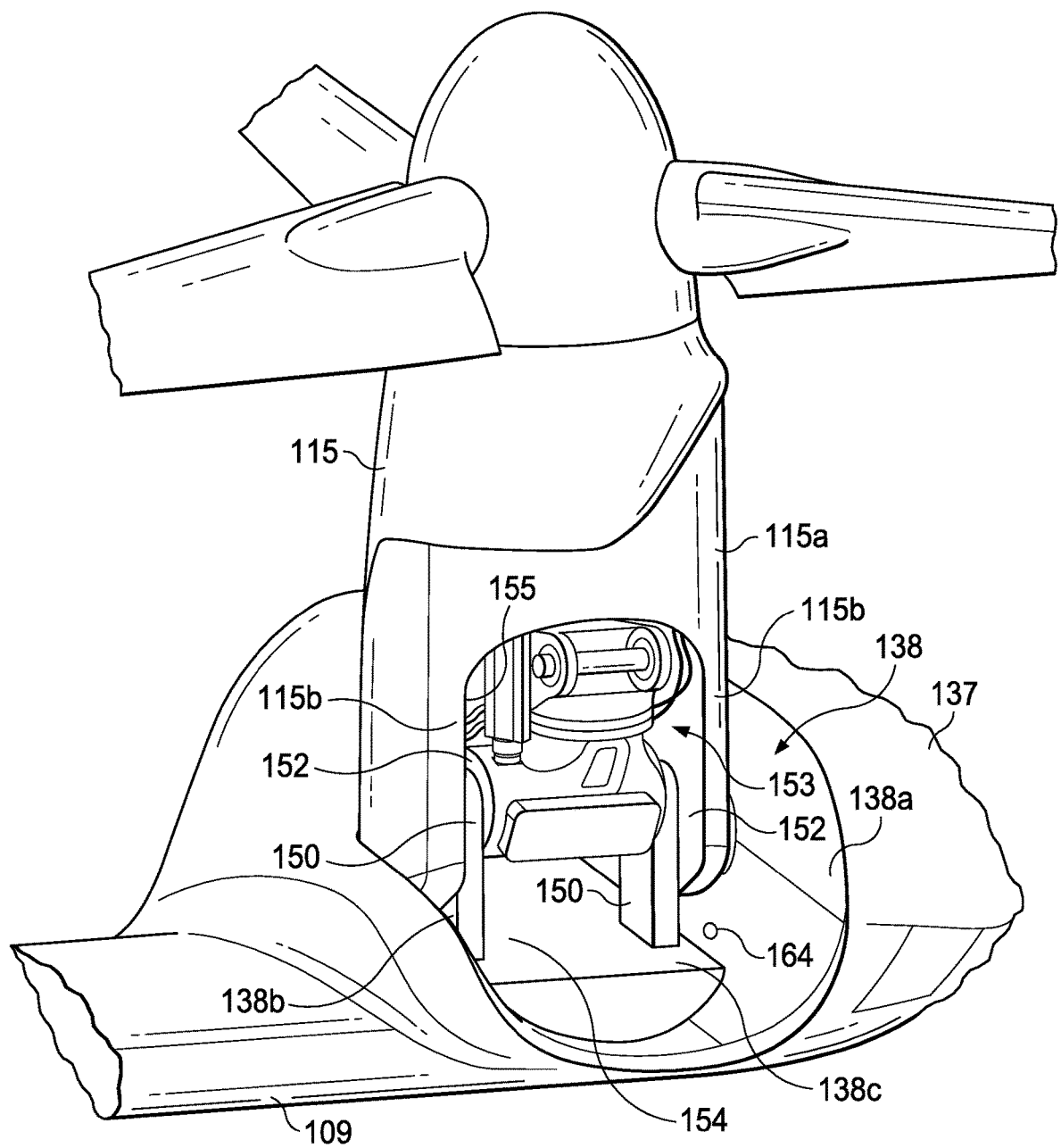
FIG. 3 is a partial perspective view of the proprotor rotated to the vertical position relative to the fixed nacelle for operation in vertical flight mode and showing exposed portions of internal components and pillow blocks that rotatably support the proprotor pylon, pillow block-receiving slots and additional gaps between the vertical proprotor pylon and the fixed nacelle.

In the illustrated embodiments, the fixed nacelle 137, the proprotor pylon 115, and the proprotor 116 are disposed on the outboard end of wing member 109. The fixed nacelle 137 is fixed relative to the wing member 109. The fixed nacelle 137 includes an engine nacelle 137a that encloses an engine, such as for example a turbine engine, and parts of a torque transfer mechanism that provides power to a proprotor gearbox. The fixed nacelle 137 includes a nacelle opening 138 that receives the proprotor pylon 115 therein. The nacelle opening 138 is disposed on the leading edge of the wing 109. The nacelle opening 138 includes a first side 138a, a second side 138b, and a floor 138c. Proprotor pylon 115 is supported by a pair of pillow blocks 150 (an outboard pillow block and inboard pillow block) disposed in the nacelle opening floor 138c. Pylon fairing 115a can include a cavity 155 that is defined laterally by pylon fairing sides 115b and permits access to internal components therein (e.g., output shaft, spindle gearbox, and wiring). Proprotor pylon 115 rotates about axis A in nacelle opening 138 as the aircraft 101 transitions between the forward flight mode (airplane mode) and the vertical flight mode (helicopter mode). When proprotor pylon 115 is in forward flight mode (airplane mode), proprotor pylon 115 is adjacent to the nacelle opening floor 138c in a horizontal position and occupies nacelle opening 138. When proprotor pylon 115 is in vertical flight mode (helicopter mode), as shown in FIG. 3, internal components 153 (e.g., output shaft, spindle gearbox, and wiring) within cavity 155 and pillow blocks 150 are exposed to ballistic strikes, bird strikes, and/or environmental elements. In addition, in vertical flight mode, openings (e.g., cavity 155, gaps 152 adjacent to the pillow blocks 150) in nacelle opening 138 increase infrared and/or radar signature of the aircraft 101.

A rear door 140 is connected between the fixed nacelle 137 and the proprotor pylon 115, FIG. 1. The rear door 140 is movable on a track 142 in response to rotation of the proprotor pylon 115. In the forward flight mode, the rear door 140 is closed to cover the mechanical components enclosed within the fixed nacelle 137. In vertical flight mode or a conversion (transition) mode, the rear door 140 is at least partially opened to accommodate movement (rotation) of the proprotor pylon 115.

In certain exemplary embodiments, a movable cover 160 is associated with the fixed nacelle 137 for rotation to a closed position C when the proprotor pylon 115 is positioned in a non-horizontal position (e.g., conversion mode and/or helicopter mode), as shown in FIGS. 1, 4-5, and 7. The closed position C of the movable cover 160 obstructs at least a portion of the pillow blocks 150, internal components 153, cavity 155, and/or proprotor pylon 115. In some embodiments, the closed position C of the movable cover 160 completely obstructs the pillow blocks 150, internal components 153, and cavity 155. In certain embodiments, movable cover 160 is disposed anterior to the pillow blocks 150. In still some embodiments, movable cover 160 is disposed adjacent to the pillow blocks 150. The movable cover 160 can form a protective cover 161 in front of nacelle opening 138 when in the closed position C. The movable cover 160 is configured to move to a stowed position SP, as shown in FIG. 6, which can occur when the proprotor pylon 115 is in a horizontal position and/or for maintenance of the proprotor pylon 115. The movable cover 160 in the closed position C can advantageously reduce infrared and radar signatures; protect the exposed proprotor components from ballistic strikes, bird strikes, and environmental elements; and/or reduce adverse aerodynamic effects caused by openings in the proprotor pylon 115.

In certain embodiments, the movable cover 160 is shown having a curved flat front surface 160a that laterally terminates at edges 160b. However, the movable cover 160 can have any front surface profile, bulk shape, and dimensions in practice of embodiments of the invention in order to protect the exposed components (e.g., pillow blocks 150, internal components 153, and/or cavity 155) and at least a portion of the proprotor pylon 115 from ballistic strikes, bird strikes and environmental elements, and/or reducing adverse aerodynamic effects.

Figure 4:
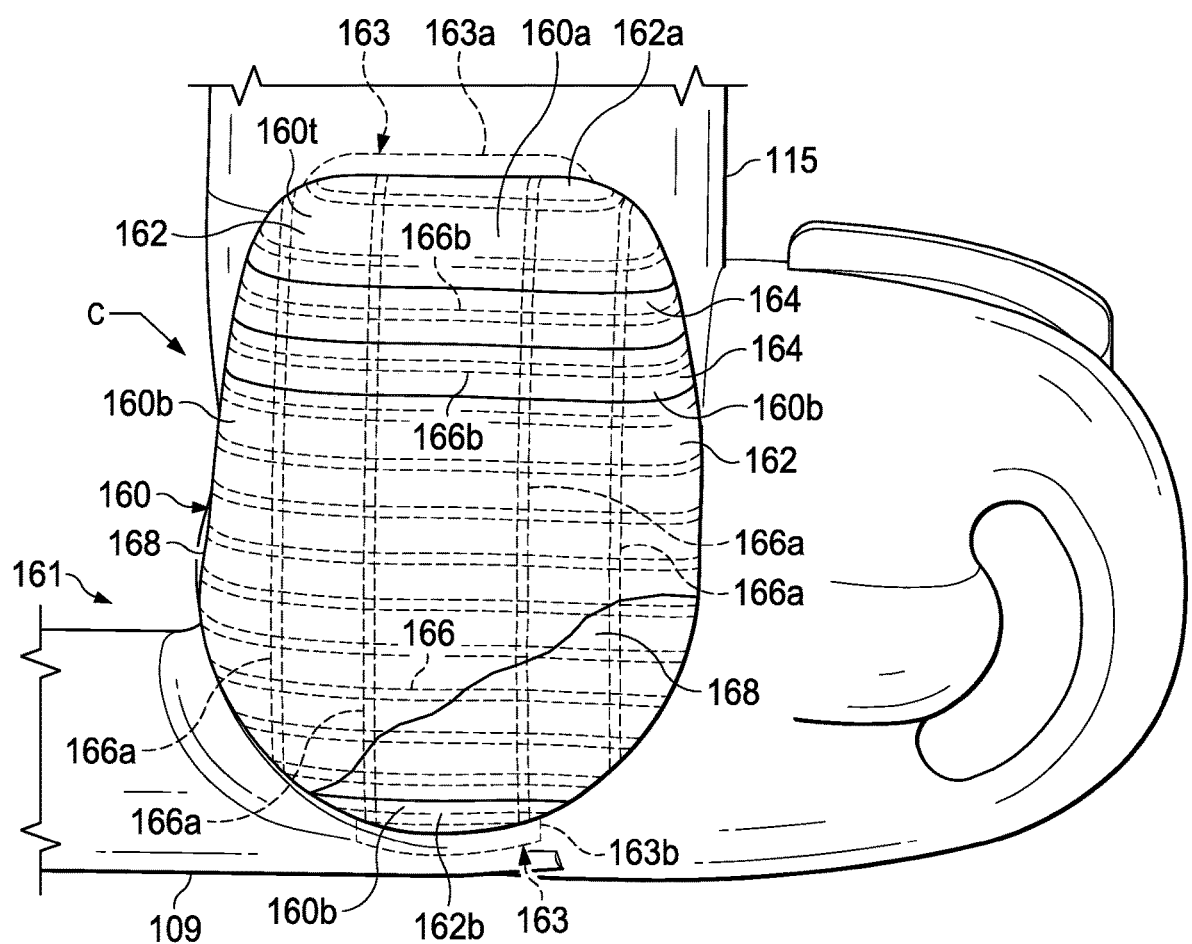
FIG. 4 is a partial front elevational view of the proprotor pylon in vertical flight mode with the movable cover in a closed position in front of the proprotor pylon to cover the proprotor nacelle opening of FIG. 1 according to an example embodiment, according to an embodiment.
Figure 5:
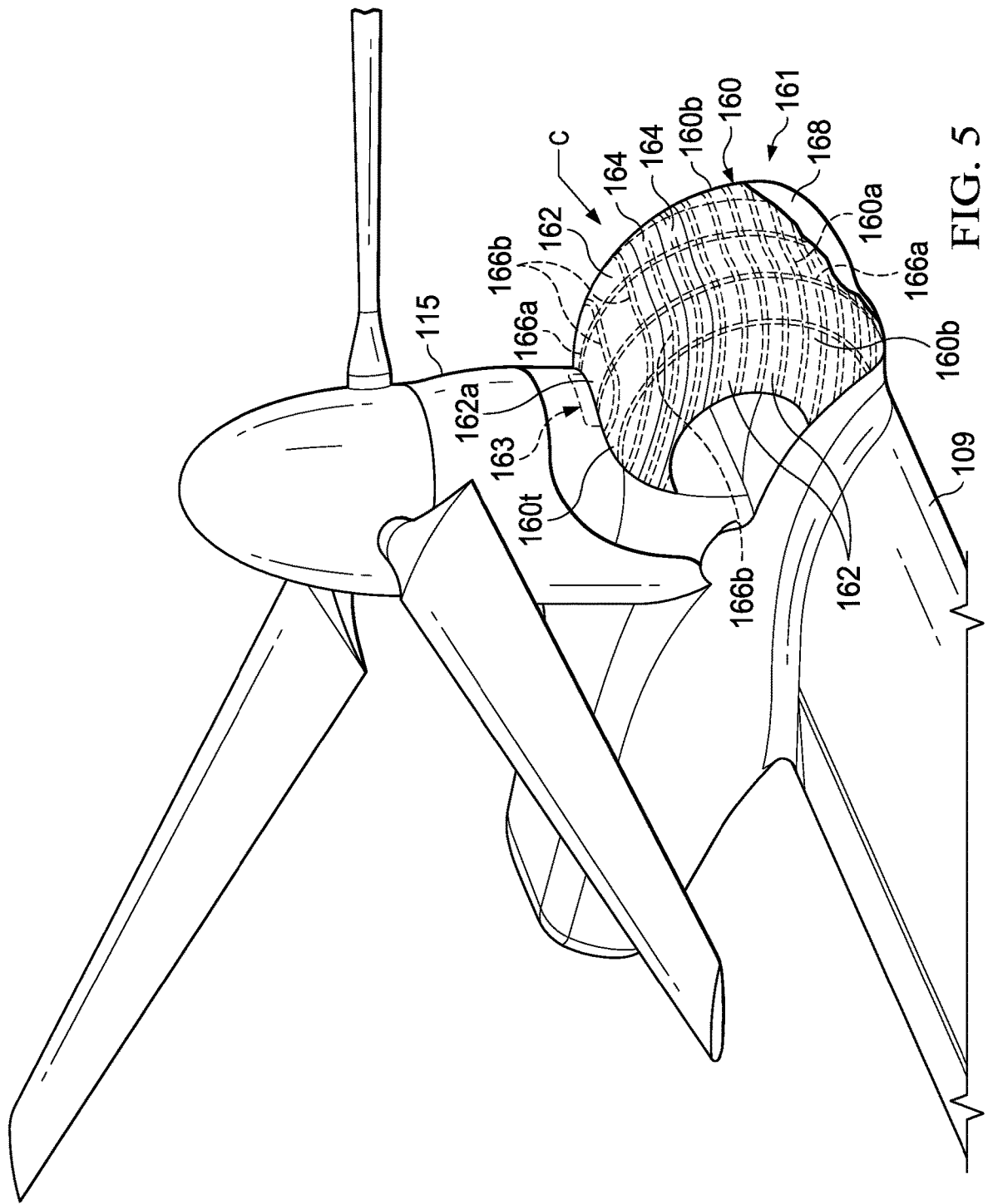
FIG. 5 is a partial perspective view of the proprotor pylon of FIG. 4 in vertical flight mode with the movable cover in a closed position, according to an exemplary embodiment.
Figure 6:
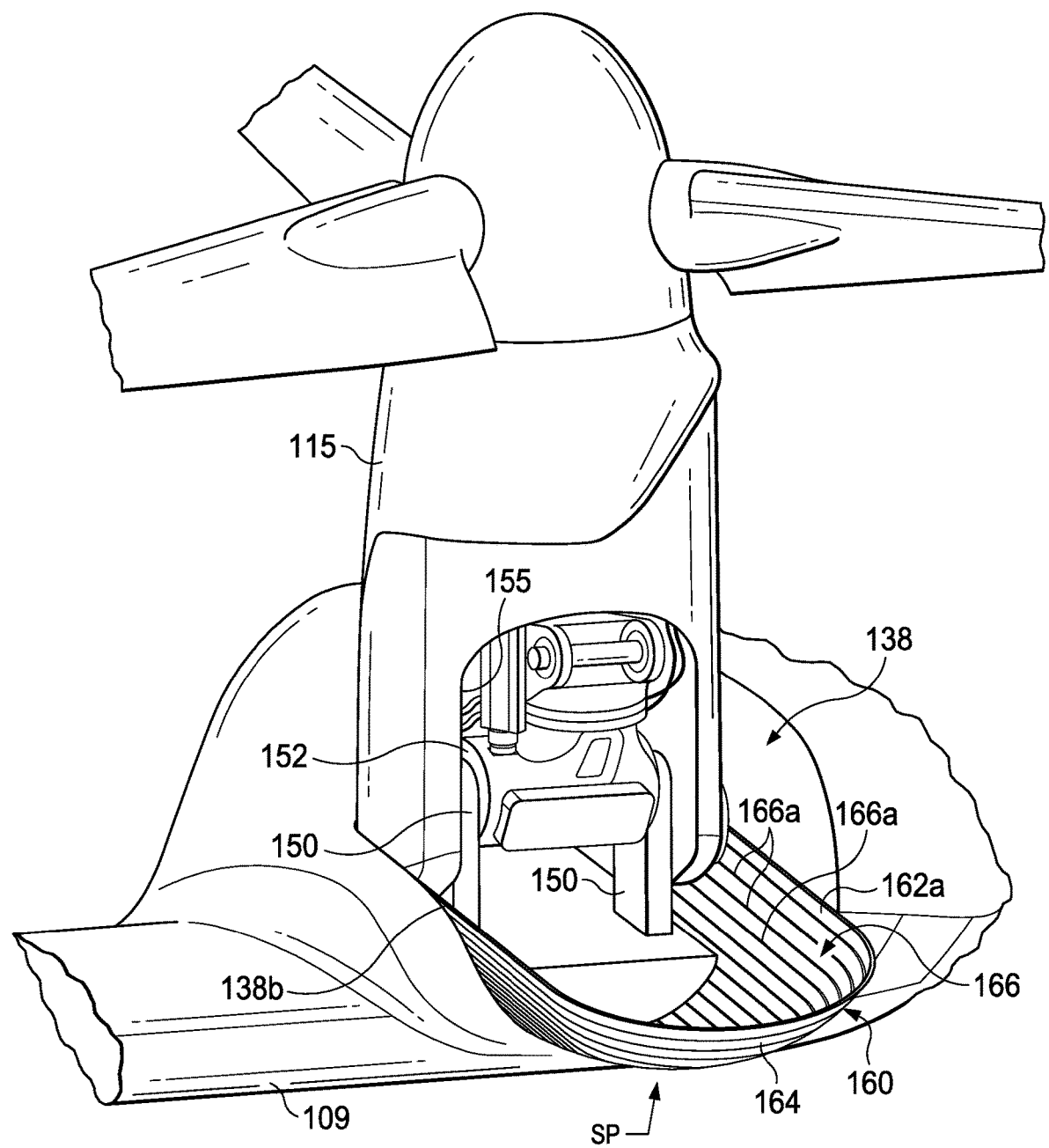
FIG. 6 is a partial perspective view of the proprotor pylon of FIG. 4 in vertical flight mode with the movable cover in a completely stowed position, according to an exemplary embodiment.

In some embodiments, as shown in FIGS. 4-5, the movable cover 160 is shown including a plurality of cover members 162. Each of the cover members 162 can be in contact with and moved by a support frame 166. The support frame 166 can be an internal support frame for the cover members 162. The support frame 166 can be configured as a flexible and/or foldable support frame with upright connector elements 166a and lateral connector elements 166b that form a flexible support network to support the plurality of cover members 162. The connector elements 166a, 166b can comprise metallic or non-metallic wires, cables, straps, and articulated links to interconnect the cover members 162 for collective movement to the closed position C when the proprotor 115 is in the non-horizontal position for conversion and helicopter modes of operation. When moved to the closed position C, the plurality of cover members 162 collectively form the protective cover 161 that substantially covers the nacelle opening 138 to protect the proprotor pylon 115 components exposed therein.

In an embodiment, at least a portion of the plurality of cover members 162 comprises a plurality of cover slats 164. The plurality of cover slats 164 can be in associated with the support frame 166 and/or the cover members 162. In an embodiment, each of the cover slats in the plurality of cover slats 164 are disposed on top of or behind the support frame 166 with or without the plurality of cover members 162 and/or the frame 166.

In an embodiment, the plurality of cover members 162 and/or the plurality of cover slats 164 can be made from a material selected from the group consisting of ceramic material, composite material, metallic material, elastomeric material, and armored material. In an exemplary embodiment, the plurality of cover members 162 and/or the plurality of cover slats 164 can be mounted on the support frame 166 by fasteners, vulcanization, molding, snap fit joints, and/or using adhesives.

In certain embodiments, the movable cover 160 can include a flexible cover 168, partially shown in FIGS. 4-5, in contact with the plurality of cover members 162, the plurality of cover slats 164, and/or the support frame 166. In some embodiments, the flexible cover 168 is disposed in front of or behind the plurality of cover members 162, the plurality of cover slats 164, and/or the support frame 166 as a protective over-layer. It should be noted that the flexible cover 168 is partially shown in FIGS. 4-5 for the purpose of clarity of illustration. It should be understood by those skilled in the art that the flexible cover 168 can cover a portion of or all of at least one of the following: the plurality of cover members 162, the plurality of cover slats 164, and the support frame 166. The flexible cover 168 can comprise one or more membranes, layers, or sheets of a protective material. The flexible cover 168 can be made from a fiber that is composed of continuous filaments or fibers including one or more of glass, carbon, graphite, graphene, basalt, an aromatic polyamide (i.e. "aramid") material, a variant of an aromatic polyamide material (e.g., a polyparaphenylene terephthalamide material, such as Kevlar by E.I. du Pont de Nemours and Company of Richmond, Va.), or the like.

In an embodiment, as shown in FIGS. 4-5, the plurality of cover members 162 is in contact via a linkage 163 with the proprotor pylon 115 at a top end 160t and/or with the nacelle opening 138 and/or the wing 109 at a bottom end 160b. In an embodiment, an uppermost cover member 162a is connected to the proprotor pylon 115 by a top linkage 163a such as a pivot joint or hinge, while the lowermost cover member 162b is connected to at least one of the channel floor 138c, wing 109, and/or fixed nacelle 137 by a bottom linkage 163b, such as a pivot shaft to impart foldability to the support frame 166. In the embodiment shown in FIGS. 4-5 and 7, the movable cover 160 is thereby mounted via the plurality of cover members 162 to the proprotor pylon 115 and the nacelle opening 138 and/or the wing 109 so that rotation of the proprotor pylon 115 rotates the movable cover 160 between the closed position, FIGS. 4-5, in the conversion mode and the helicopter mode and the stowed position SP, FIG. 6, in the forward flight (airplane) mode. It should be noted that proprotor pylon 115 is in a non-horizontal position in FIG. 6 for clarity of illustration of the movable cover 160 in the stowed position SP. It will be understood by those of ordinary skilled in the art that the proprotor pylon 115 would be oriented in the nacelle opening 138 as shown in FIG. 2.

In an embodiment, as shown in FIG. 6, the movable cover 160 is disposed at least partially in the channel 138 and/or the wing 109 when in the stowed position SP. In some embodiments, a recess is included in the nacelle floor 138c and/or in the wing 109 for receiving some or all of the movable cover 160 in the stowed position SP.

Figure 7:
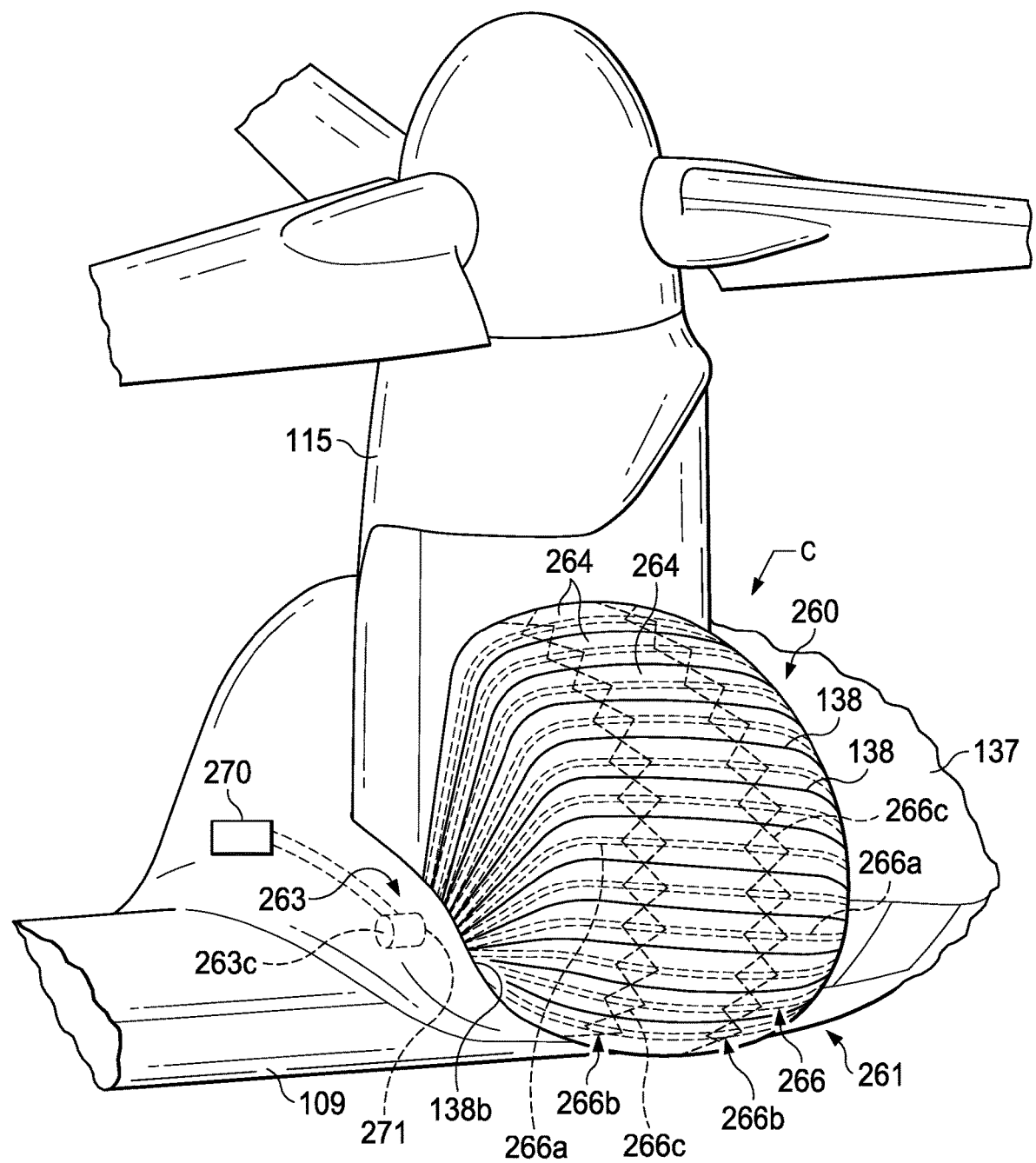
FIG. 7 is a partial perspective view of a proprotor pylon in vertical flight mode with a movable cover in a closed position employing a foldable gate-type support frame on which the cover members are disposed according to another example embodiment.

FIG. 7 is another example of a movable cover 260. Certain components of the movable cover 260 are as described above in connection with the movable cover 160, except as noted herein. Those components bear similar reference characters to the components in the movable cover 160 but with a leading '2' rather than a leading '1'. The movable cover 260 includes an illustrative example of a support frame 266. The support frame 266 is a foldable support frame; for example, but not limitation, support frame 266 can be at least one of a gate-type support frame, an accordion-type support frame, vehicle convertible top-type support frame, and other support frame configurations that can move the plurality of cover slats 264 between the closed and stowed positions C, SP.

For purposes of illustration and not limitation, a certain embodiment of the support frame 266 can employ a foldable (collapsible) gate-type support frame on which the plurality of cover slats 264 are interleaved by folding and unfolding the support frame 266. In the illustrative embodiment, the support frame 266 includes criss-cross connector elements 266c that facilitate the folding and unfolding of the support frame 266. The support frame 266 has a forwardly bowed contour F at the closed position C to permit the plurality of cover slats 264 to be stacked in the stowed position SP and to improve aerodynamic performance, although other cover shapes and contours can be employed in practice of the invention.

In an exemplary embodiment, as shown in FIG. 7, the plurality of cover slats 264 can be comprised of a plurality of laterally-elongated slats mounted on the support frame 266 by fasteners, vulcanization, molding, snap fit joints, and/or using adhesives. Each of the cover slats 264a in the plurality of cover slats 264 can have individual orientations and shapes that follow the contour of the fixed nacelle 137 and/or wing 109; substantially cover the exposed components (e.g., pillow blocks 150, internal components 153, and/or cavity 155) and at least a portion of the proprotor pylon 115; and/or permit the plurality of cover slats 264 to nest or stack one atop the other, or side-by-side, when the proprotor pylon 115 is positioned in the substantially horizontal position for the forward flight (airplane) mode. In an exemplary embodiment, the each of the cover slats overlaps at least a portion of the adjacent cover slat in the plurality of cover slats 264. Each of the cover slats in the plurality of cover slats 264 can be rigid and/or flexible (deformable). Although FIG. 7 shows the plurality of cover slats 264 as having a generally flat front portion and generally horizontal slats, other slat orientations and shapes can be used in practicing embodiments of the invention.

In certain embodiments, as shown in FIG. 7, the movable cover 260 includes a linkage 263 that includes a pivot member 263c. The pivot member 263c can be mounted on the fixed nacelle 137, the first side 138a of the nacelle opening 138, and/or the second side 138b of the nacelle opening 138 to permit rotation of the movable cover 160 about the substantially horizontal axis of the pivot member 263c. In an embodiment, the fixed nacelle 137 includes opposing openings 271 (one shown in FIG. 7) to rotationally receive the pivot member 263c therein. In an exemplary embodiment, the pivot member 263c is a shaft with ends received in the opposing openings 271. The openings 271 optionally may include a respective bushing, bearing, and the like to receive a respective end of the pivot member for rotation about the horizontal shaft axis. The movable cover 260 alternatively can be constructed and assembled to rotate about an axis that is substantially vertical, or at another axis, so long as the movable cover 260 can be positioned in front of the proprotor pylon 115 when the proprotor is positioned in the conversion mode and in the helicopter mode of operation.

In some embodiments, as shown in FIG. 7, the movable cover 260 includes an actuator 270 coupled thereto to move at least a portion of the plurality of cover members 262. In some embodiments, the actuator 270 is disposed on or in the fixed nacelle 137 for independently rotating the movable cover 260 between the stowed position SP and the closed position C in front of the proprotor pylon 115 in the conversion mode and the helicopter mode of operation. The actuator 270 can be an electrical actuator, hydraulic actuator, mechanical actuator, or other actuator coupled to the movable cover 260 or coupled via a linkage (e.g., coupled to the pivot member 263c to move the support frame 266) to the movable cover 260. In an exemplary embodiment, the actuator 270 is comprised of a series of gears powered by an electric motor managed by a controller. Control of the actuator 270 can be synchronized with rotation of the proprotor pylon 115 so that motion of the movable cover 260 follows the rotation of the proprotor pylon between the stowed position S and the closed position C. Alternatively, the actuator 270 can be controlled independently to position the movable cover 260 at the closed position C after the proprotor pylon is positioned in the substantially vertical position for the helicopter mode of operation. That is, the actuator can be controlled to move the movable cover 260 as the proprotor pylon 115 is rotated, or after the proprotor pylon 115 is fully rotated to the substantially vertical position. In an embodiment, the movable cover 260 includes only an actuator 270 and top and bottom linkages (e.g., top and bottom linkages 263a, 263b) are omitted.

Figure 8A:
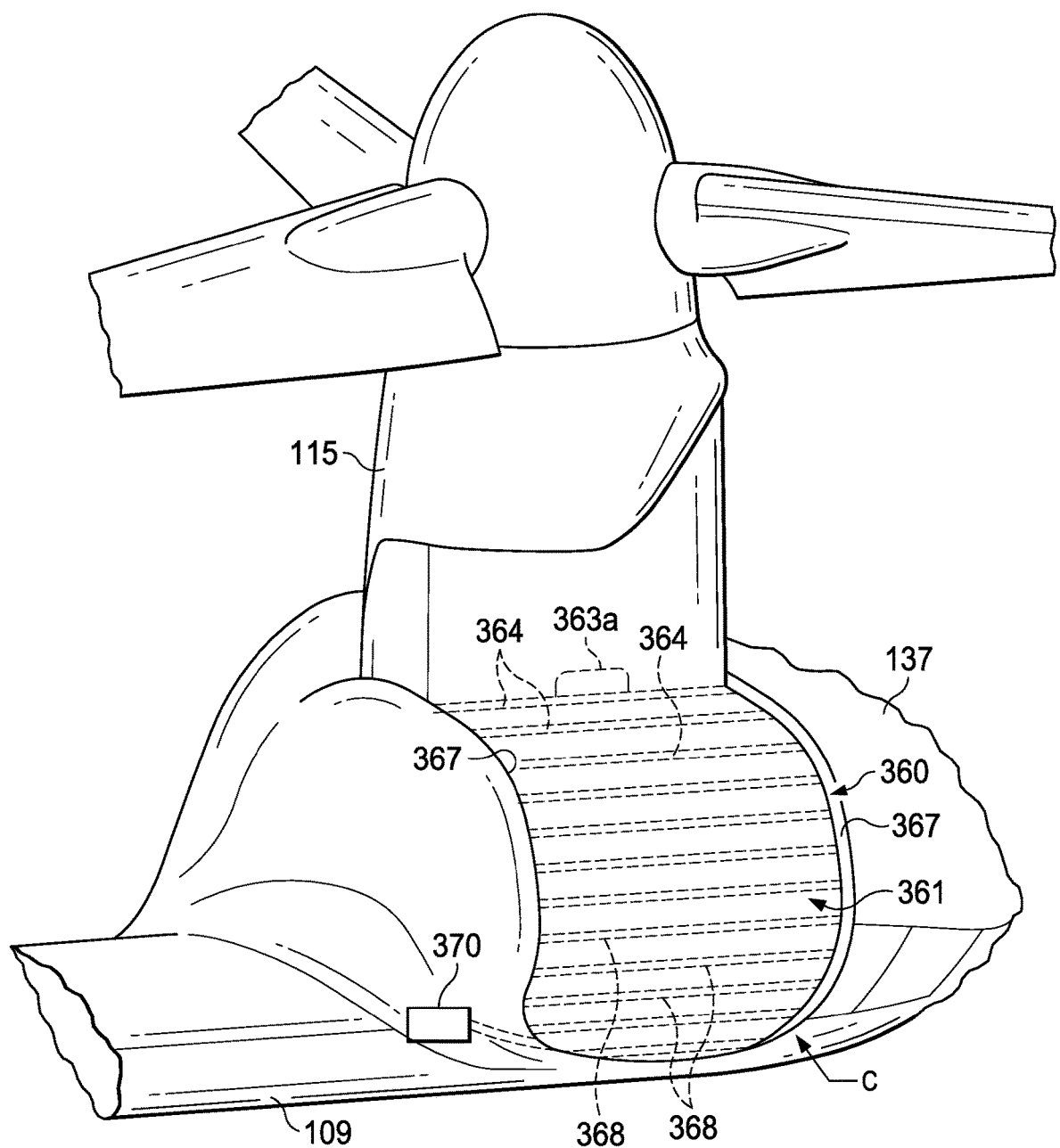
FIG. 8A is a partial perspective view of a proprotor pylon in vertical flight mode with a movable cover including a plurality of cover slats disposed for movement on support tracks which are mounted on at least one of the fixed engine nacelle and aircraft wing, the movable cover in a closed position, according to still another example embodiment.
Figure 8B:
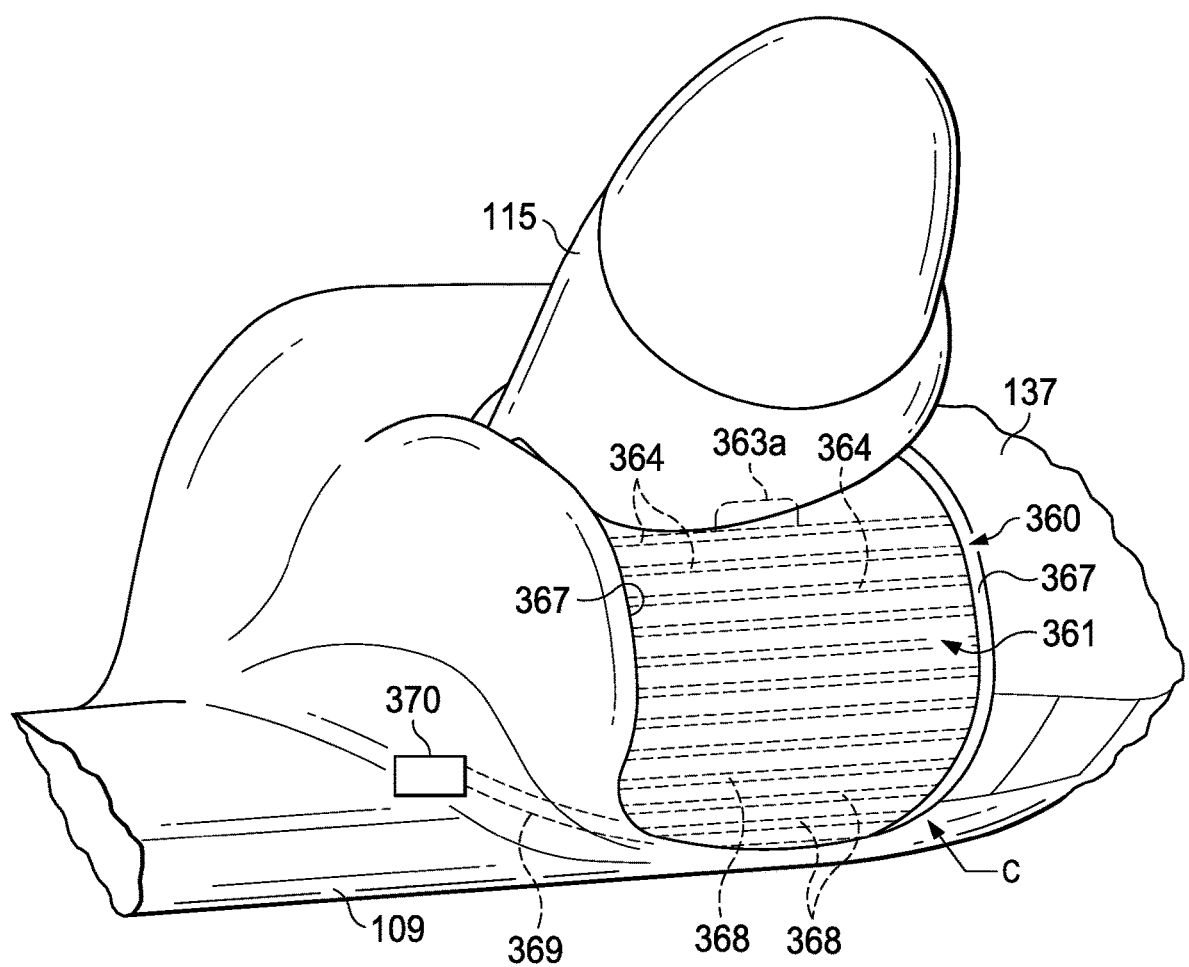
FIG. 8B is a partial perspective view of a proprotor pylon in conversion flight mode with the movable cover of FIG. 8A in a partially closed position, according to still another example embodiment.

FIGS. 8A-8B is another example of a movable cover 360. Certain components of the movable cover 360 are as described above in connection with the movable cover 160, 260, except as noted herein. Those components bear similar reference characters to the components in the movable cover 160, 260 but with a leading '3' rather than a leading '1' or '2'. The movable cover 360 includes a pair of support tracks 367 that can be disposed on at least one of the following: the fixed engine nacelle 137, the first side 138a of the nacelle opening 138, the second side 138b of the nacelle opening 138, and/or the wing 109.

The movable cover 360 includes a plurality of cover members 362 comprising a plurality of cover slats 364. The lateral ends of the plurality of cover slats 364 are disposed in the pair of support tracks 367 for collective movement therein between the closed position C, where the plurality of cover slats 364 form a protective cover 361 in front of the nacelle opening 138, and a stowed position SP on the support tracks 367. The plurality of cover slats 364 are so oriented and shaped that, at the closed position, plurality of cover slats 364 substantially cover all of the proprotor pylon 115 components exposed by the nacelle opening 138. The support tracks 367 and plurality of cover slats 364 are analogous in general construction to a roll-top vehicle console or roll-top desk.

The plurality of cover slats 364 can be interlinked by fastening them onto a flexible cover 368, such as flexible Kevlar fabric, or by having pivotal or other mechanical joints between adjacent cover slats so as to move in unison on the support tracks 367. In an embodiment, the uppermost cover slat 364a is pivotally connected by a linkage 363a to the proprotor pylon 115, while the lowermost cover slats 364b can be free to ride on the support tacks 367 or connected by a bottom linkage 363b to the channel floor 138c, wing 109, and/or fixed nacelle 138.

The support tracks 367 are shaped to permit the plurality of cover slats 364 to be moved in response to rotation of the proprotor 115 between the stowed position SP and the closed position C. At the closed position C, the plurality of cover slats 364 are positioned on the support tracks 367 in front of the proprotor pylon 115 to cover the nacelle opening 138 and the proprotor components exposed there. At the stowed position SP, at least some of the plurality of cover slats 364 are stowed on the support tracks 367 in a recess 369 provided in the floor 138c of the nacelle opening 138 (e.g. see FIG. 8B), or inside or under the aircraft wing 109 depending upon the shape chosen for the support tracks 367.

In an embodiment, the movable cover 360 includes an actuator 370 coupled thereto to move at least a portion of the plurality of cover slats 364. In some embodiments, the actuator 370 is disposed on or in the fixed nacelle 137 for independently rotating the movable cover 360 between the stowed position SP and the closed position C in front of the proprotor pylon 115 in the conversion mode and the helicopter mode of operation. The actuator 370 can be an electrical actuator, hydraulic actuator, mechanical actuator, or other actuator coupled to the movable cover 360 or coupled via a linkage. In an exemplary embodiment, the actuator 370 is a rack and pinion system. In another exemplary embodiment, the actuator 370 is a plurality of cams that drivingly engage the plurality of cover slats 364 through the support tracks 367. Control of the actuator 370 can be synchronized with rotation of the proprotor pylon 115 so that motion of the movable cover 360 follows the rotation of the proprotor pylon between the stowed position S and the closed position C. Alternatively, the actuator 370 can be controlled independently to position the movable cover 360 at the closed position C after the proprotor pylon is positioned in the substantially vertical position for the helicopter mode of operation. That is, the actuator can be controlled to move the movable cover 360 as the proprotor pylon 115 is rotated, or after the proprotor pylon 115 is fully rotated to the substantially vertical position. In an embodiment, the movable cover 360 includes only an actuator 370 and top and bottom linkages (e.g., top and bottom linkages 363a, 263b) are omitted.

Figure 9A:
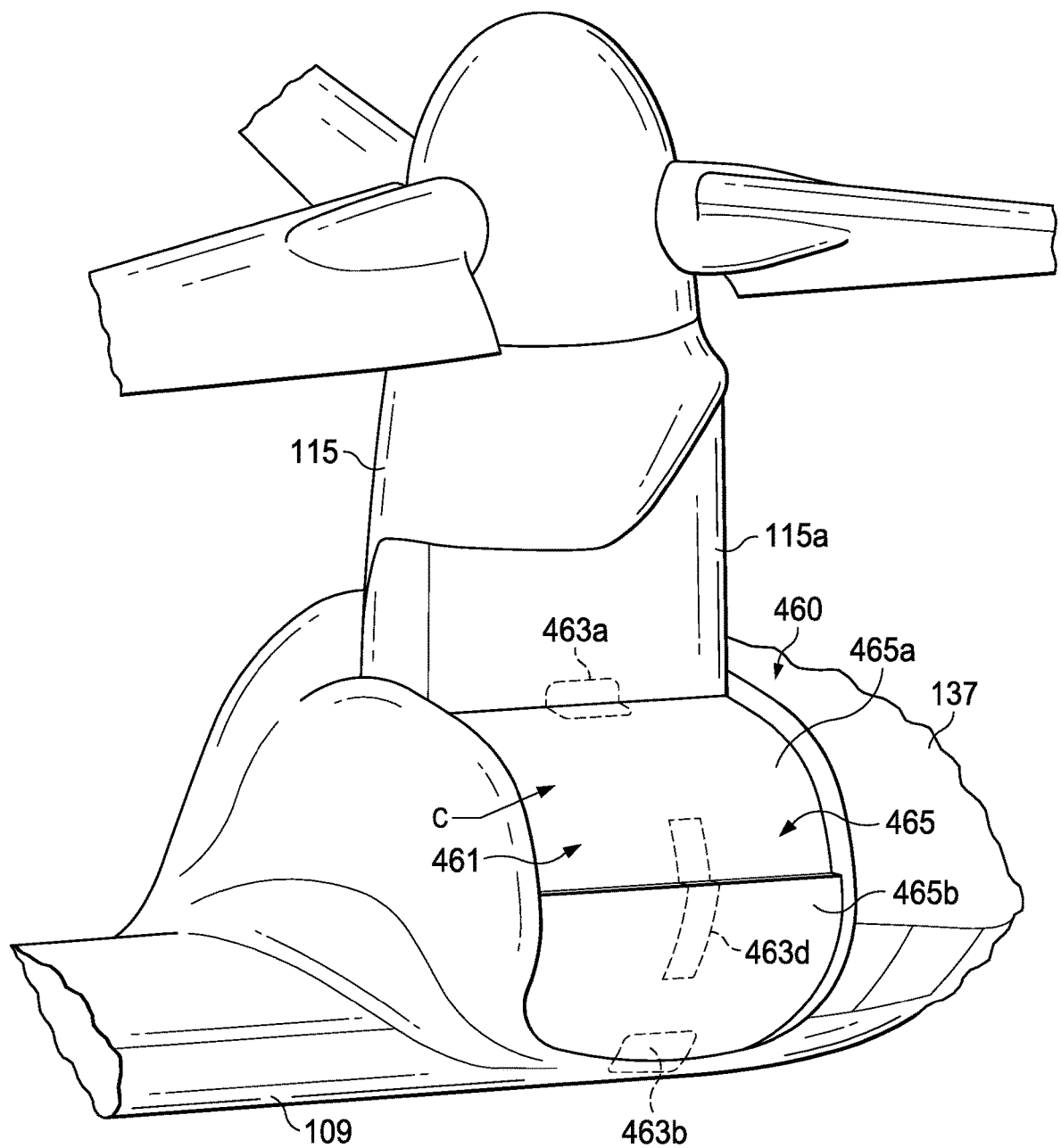
FIG. 9A is a partial perspective view of a proprotor pylon in vertical flight mode with a movable cover including a plurality of cover shells, the movable cover in a closed position, according to another illustrative embodiment.
Figure 9B:
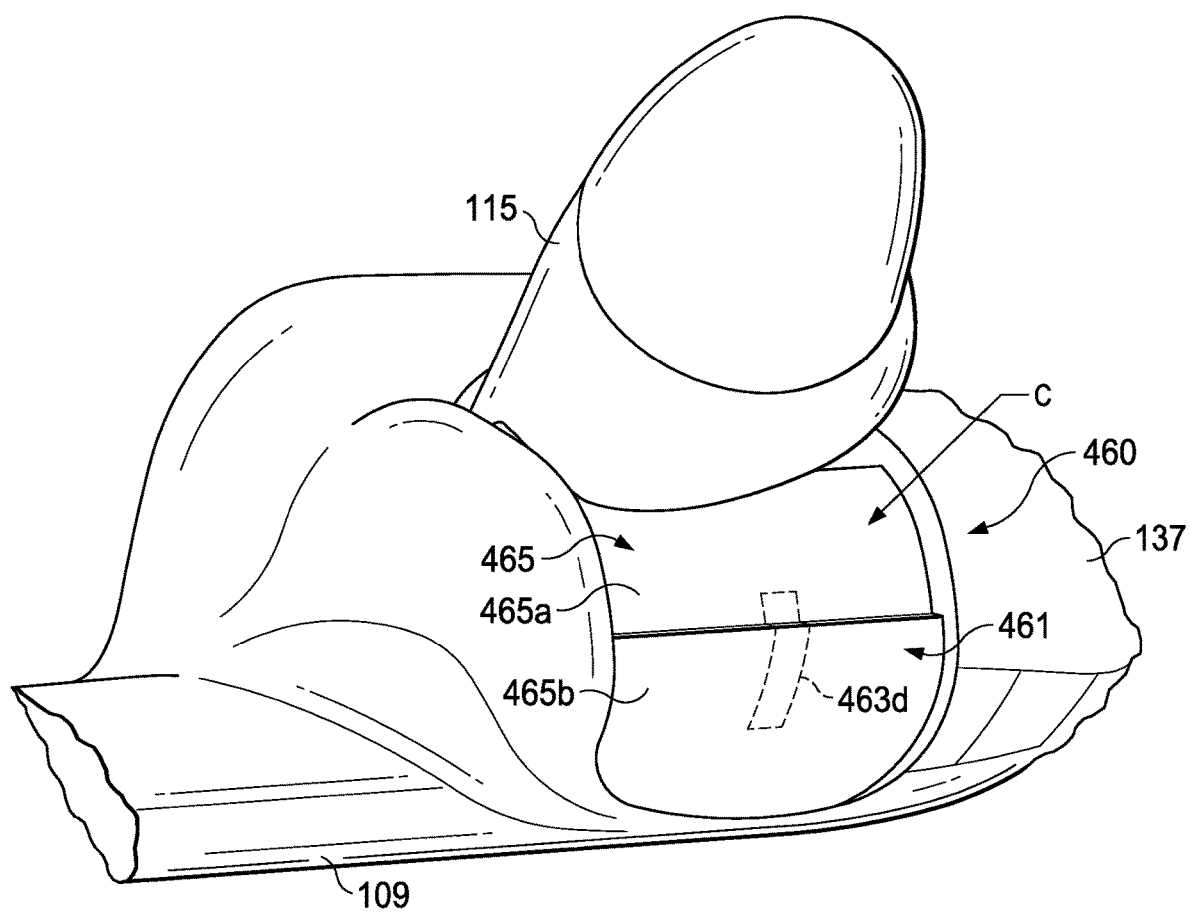
FIG. 9B is a partial perspective view of a proprotor pylon in conversion flight mode with the movable cover of FIG. 9A in a partially closed position, according to still another example embodiment.

FIGS. 9A-9C is another example of a movable cover 460. Certain components of the movable cover 460 are as described above in connection with the movable cover 260, except as noted herein. Those components bear similar reference characters to the components in the movable cover 260 but with a leading '4' rather than a leading '2'. The movable cover 460 includes a plurality of cover shells 465. The plurality of cover shells 465 can be practiced with self-supporting cover shells without the need for a support frame. For purposes of illustration and not limitation, a plurality of cover shells 465 in the form of upper cover shell 465a and a lower cover shell 465b can be movably connected to one another between the fixed engine nacelle 138 and the proprotor pylon 115. The upper cover shell 465a is pivotally connected to the proprotor pylon 115 by a top linkage 463a. The lower cover shell 465b is connected to at least one of the following: the nacelle floor opening 138c, the fixed nacelle 137, and/or the wing 109 by bottom linkage 463b. In an illustrative embodiment, the bottom linkage 463b can be a sliding pivotal linkage disposed on the bottom interior wall 137w of the fixed nacelle 137. The upper and lower cover shells 465a, 465b are interconnected via a middle linkage 463d to one. In an embodiment, the middle linkage 463d is a sliding pivotal linkage.

In an illustrative embodiment, the upper and lower cover shells 465a, 465b are each a clam-shell shape that together form a protective cover 461 when in a closed position C. The geometry of the upper and lower cover shells 465a, 465b is selected to substantially protect exposed components (e.g., pillow blocks 150, internal components 153, and/or cavity 155) and at least a portion of the proprotor pylon 115 from ballistic strikes, bird strikes and environmental elements, and/or reducing adverse aerodynamic effects. In an illustrative embodiment, the upper shell 465a is smaller than the lower cover shell 465b to facilitate telescopically folding into the stowed position SP. It should be appreciated that the geometry of the upper and lower cover shells 465a, 465b may take on a wide variety of configurations. The plurality of cover shells 465 (e.g., upper and/or lower cover shells 465a, 465b) can be made of a material selected from the group consisting of ceramic material, composite material, metallic material, and armored material.

Referring to FIG. 9A, the movable cover 460 is shown in the closed position C to substantially cover the exposed components (e.g., pillow blocks 150, internal components 153, and/or cavity 155) and at least a portion of the proprotor pylon 115 when the proprotor pylon is in the helicopter mode of operation. In an embodiment of the closed position C during helicopter mode, the movable cover 460 is disposed anterior to the proprotor pylon 115 and substantially above the channel floor 138c. In an illustrative embodiment, the upper and lower cover shells 465a, 465b are pivoted to their topmost position to form a protective cover 461 in the closed position C.

Now referring to FIG. 9B, the movable cover 460 is shown in the closed position C to substantially cover the exposed components (e.g., pillow blocks 150, internal components 153, and/or cavity 155) and at least a portion of the proprotor pylon 115 when the proprotor pylon is in the conversion mode of operation. In an embodiment of the closed position C during conversion mode, the movable cover 460 is disposed anterior to the proprotor pylon 115 and at least one of the upper and lower cover shells 465a, 465b is partially retracted downward. In an illustrative embodiment, the upper cover shell 465a is partially retracted downward and posterior to the lower cover shell 465b as the proprotor pylon 115 is rotating in the conversion mode. In some embodiments, at least one of the upper and lower cover shells 465a, 465b is above the channel floor 138c while the opposite cover shell is partially stowed and slid below the channel floor 138c.

Now referring to FIG. 9C, the movable cover 460 is shown in the stowed position SP when the proprotor pylon 115 is in a horizontal position in the forward flight (airplane) mode of operation. In an embodiment of the stowed position SP during forward flight mode, the movable cover 460 is disposed below the proprotor pylon 115 and substantially below the channel floor 138c. In an illustrative embodiment, the upper and lower cover shells 465a, 465b have pivoted and slid below the proprotor pylon 115. The upper cover shell 465a is slid atop the lower cover shell 465b in the stowed position SP during the airplane mode. In an exemplary embodiment, at least a portion of the upper and lower cover shells 465a, 465b are disposed in recess 469 in the floor 138c of the nacelle opening 138. The recess 469 can be shaped to receive and stow the stacked upper and lower cover shells at least partial and/or completely therein during the forward flight (airplane) mode of operation.

The movable cover is especially useful for, although not limited to, tiltrotor aircraft having a fixed nacelle 137 and a proprotor pylon 115 to achieve the above-mentioned improvements in reducing infrared and radar signatures, protecting the exposed proprotor components from ballistic strikes, bird strikes and environmental elements, and reducing adverse aerodynamic effects. Moreover, the movable cover is amenable to ice protection by providing engine bleed air or other heating of the protective cover.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Terms such as "first" and "second" are used only to differentiate features and not to limit the different features to a particular order or to a particular quantity.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. An aircraft, comprising:
a fixed nacelle disposed on a wing of the aircraft, the fixed nacelle comprising a nacelle opening;
a proprotor pylon disposed on the wing and rotatable relative to the fixed nacelle between a substantially horizontal position and a non-horizontal position, wherein rotation of the proprotor pylon to the non-horizontal position exposes the nacelle opening; and
a movable cover disposed on at least one of the wing and the fixed nacelle, said movable cover comprising a plurality of cover members that are movable between a closed position where at least a portion of the cover members collectively form a protective cover in front of the nacelle opening when the proprotor pylon is positioned in the non-horizontal position and a stowed position where at least a portion of the plurality of cover members are stowed.

2. The aircraft of claim 1, further including a linkage connected between the movable cover and the proprotor pylon that rotation of the proprotor pylon moves the cover members to a closed position.

3. The aircraft of claim 1, further including an actuator coupled to the movable cover to move at least a portion of the plurality of cover members.

4. The aircraft of claim 1, wherein the fixed nacelle defines a channel that receives the proprotor pylon when the proprotor pylon is rotated to the substantially horizontal position.

5. The aircraft of claim 4, wherein the movable cover is stowed at least partially in the channel of the fixed nacelle.

6. The aircraft of claim 1, wherein the movable cover is stowed at least partially in the wing.

7. The aircraft of claim 1, wherein the plurality of cover members comprises a plurality of cover slats.

8. The aircraft of claim 7, wherein the plurality of cover slats is disposed on a support frame.

9. The aircraft of claim 8, wherein the support frame is disposed on at least one of the wing and the fixed nacelle.

10. The aircraft of claim 8, further including a flexible cover in contact with at least one of the following: the plurality of cover members, the plurality of cover slats, and the support frame.

11. The aircraft of claim 7, wherein the cover slats are interlinked and movably coupled to a plurality of support tracks.

12. The aircraft of claim 11, wherein the cover slats are interlinked by being in contact with a flexible secondary layer.

13. The aircraft of claim 1, wherein the cover members comprise a plurality of cover shells.

14. The aircraft of claim 13, wherein the plurality of cover shells comprises telescoping cover shells that are pivotally and slidably connected.

15. The aircraft of claim 1, wherein the protective cover has a forwardly bowed shape when the proprotor pylon is in a non-horizontal position.

16. The aircraft of claim 1, wherein the plurality of cover members comprise a material selected from at least one of the following: a ceramic material, a composite material, a metallic material, an elastomeric material, and an armored material.

17. A method of covering a nacelle opening associated with rotation of a proprotor pylon to a non-horizontal position, comprising so moving a movable cover having a plurality of cover members that the plurality of cover members collectively form a protective cover in front of the nacelle opening that is exposed when the proprotor pylon is rotated.

18. The method of claim 17, wherein the movable cover is moved by linking the movable cover to a proprotor pylon for movement with the proprotor pylon.

19. The method of claim 17, wherein the movable cover is moved by an actuator.

* * * * *